(12) United States Patent
Leskuski et al.

(10) Patent No.: US 7,047,417 B2
(45) Date of Patent: May 16, 2006

(54) SYSTEMS AND METHODS FOR ACCESSING REPORTING SERVICES

(76) Inventors: Walter J. Leskuski, 807 Young Pl., Frederick, MD (US) 21702; Prakash A. Trivedi, 14700 Flagler Ct., Centreville, VA (US) 20120; Eric M. Busch, 120 16th Ave. Ct., Hiawatha, IA (US) 52233

( * ) Notice: Subject to any disclaimer, the term of this patent is extended or adjusted under 35 U.S.C. 154(b) by 838 days.

(21) Appl. No.: 10/097,935

(22) Filed: Mar. 15, 2002

(65) Prior Publication Data

US 2002/0194504 A1 Dec. 19, 2002

Related U.S. Application Data

(60) Provisional application No. 60/276,923, filed on Mar. 20, 2001, provisional application No. 60/276,953, filed on Mar. 20, 2001, provisional application No. 60/276,955, filed on Mar. 20, 2001, provisional application No. 60/276,954, filed on Mar. 20, 2001.

(51) Int. Cl.
*G06F 11/30* (2006.01)

(52) U.S. Cl. ............... 713/182; 713/200; 713/201; 713/202

(58) Field of Classification Search ........... 713/182, 713/200, 201, 202
See application file for complete search history.

(56) References Cited

U.S. PATENT DOCUMENTS

| | | | |
|---|---|---|---|
| 5,608,720 A | 3/1997 | Biegel et al. | |
| 5,758,343 A | 5/1998 | Vigil et al. | |
| 5,877,759 A | 3/1999 | Bauer | |
| 5,999,612 A | 12/1999 | Dunn et al. | |
| 6,008,805 A | 12/1999 | Land et al. | |
| 6,092,197 A * | 7/2000 | Coueignoux | 713/200 |
| 6,115,741 A | 9/2000 | Domenikos et al. | |
| 6,125,391 A | 9/2000 | Meltzer et al. | |
| 6,145,001 A | 11/2000 | Scholl et al. | |
| 6,154,743 A | 11/2000 | Leung et al. | |
| 6,161,127 A * | 12/2000 | Cezar et al. | 709/203 |
| 6,175,565 B1 | 1/2001 | McKinnon | |
| 6,189,033 B1 | 2/2001 | Jin et al. | |
| 6,192,405 B1 | 2/2001 | Bunnell | |
| 6,192,418 B1 | 2/2001 | Hale et al. | |
| 6,195,697 B1 | 2/2001 | Bowman-Amuah | |
| 6,208,986 B1 | 3/2001 | Schneck et al. | |
| 6,282,281 B1 | 8/2001 | Low | |
| 6,330,560 B1 | 12/2001 | Harrison et al. | |

(Continued)

FOREIGN PATENT DOCUMENTS

| | | |
|---|---|---|
| WO | 97/22209 | 6/1997 |
| WO | 98/53582 | 11/1998 |

OTHER PUBLICATIONS

"Netscape ECXpert Data Sheet", Netscape.com, copyright 2000, pp. 1-5.

(Continued)

*Primary Examiner*—Thomas R. Peeso

(57) ABSTRACT

An operational support system includes a network interface and a report unit. The network interface receives an identifier and password from a user, determines whether to grant access to the operational support system based on the identifier and password, and transmits, when access is granted, the identifier and password to the report unit. The report unit automatically compares the identifier and password to stored identifiers and passwords and grants access to the report unit when the identifier and password correspond to one of the stored identifiers and passwords.

30 Claims, 13 Drawing Sheets

U.S. PATENT DOCUMENTS

| | | |
|---|---|---|
| 6,418,324 B1 | 7/2002 | Doviak et al. |
| 2001/0032076 A1 | 10/2001 | Kursh |
| 2001/0037379 A1 | 11/2001 | Livnat |
| 2001/0037469 A1 | 11/2001 | Gupta et al. |
| 2001/0049745 A1 | 12/2001 | Schoeffler |
| 2002/0023232 A1 | 2/2002 | Serani et al. |

OTHER PUBLICATIONS

Putman, Janis, "Distribution Transparencies for Integrated System", Janis Putman, MITRE Corp., Feb. 2000, pp. 1-18.

W. Yeong et al., "Lightweight Directory Access Protocol", RFC 1777, Mar. 1995, pp. 1-16.

"Businessware Overview", www.vitria.com, pp. 1-2, print date Mar. 14, 2002.

"Netegrity SiteMinder 4.6", www.netegrity.com, p. 1, print date Mar. 14, 2002.

"The iPlanet Web Server Keeps Data Safe", www.iplanet.com, p. 1, print date Mar. 14, 2002.

Actuate Software, www.actuate.com/products/software/software.asp, print date Apr. 17, 2002.

* cited by examiner

SYSTEMS AND METHODS FOR ACCESSING REPORTING SERVICES

RELATED APPLICATIONS

This application claims priority under 35 U.S.C. § 119(e) based on U.S. Provisional Applications: Ser. Nos. 60/276,923, 60/276,953, 60/276,955 and 60/276,954 all filed on Mar. 20, 2001, the disclosures of which are incorporated herein by reference.

FIELD OF THE INVENTION

The present invention relates generally to communications systems and, more particularly, to an operational support system that allows access to communications products and services via a single sign on operation.

BACKGROUND OF THE INVENTION

Telecommunications service providers continually increase the number of services and products they offer to customers. A recent trend, for example, is a desire to offer broadband, wireless, and Internet services. As competition increases, service providers must provide an increased level of support for these advanced services while keeping costs down.

Conventional operational support systems typically rely on a signal monolithic system to tie together multi-vendor hardware and software systems. Tying together these multi-vendor hardware and software systems is often difficult since each system may be associated with its own unique set of requirements. For example, several of the hardware and software systems may restrict access by requiring a user to register (or login). By requiring a user to login multiple times in order to gain access to the different hardware and software systems supported by the operational support system can be quite frustrating to the user.

Accordingly, there is a need in the art for systems and methods that facilitate access to the components of an operational support system.

SUMMARY OF THE INVENTION

Systems and methods consistent with the principles of the invention address this and other needs by providing a procedure that allows a user to sign in one time in order to gain access to the various systems supported by an operational support system.

In an implementation consistent with the present invention, an operational support system includes a network interface and a report unit. The network interface receives an identifier and password from a user, determines whether to grant access to the operational support system based on the identifier and password, and transmits, when access is granted, the identifier and password to the report unit. The report unit automatically compares the identifier and password to stored identifiers and passwords and grants access to the report unit when the identifier and password correspond to one of the stored identifiers and passwords.

In another implementation consistent with the present invention, a method for providing reports is disclosed. The method includes receiving information from a user at a network interface, comparing the user information to a first set of previously stored user information, capturing the user information in a cookie when the user information corresponds to the first set of previously stored user information, and transmitting the cookie to a reporting unit. The method further includes comparing the user information from the cookie to a second set of previously stored user information and providing one or more reports to the user when the user information from the cookie corresponds to the second set of previously stored user information.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of this invention provide a single sign on technique for accessing the products and services offered by an operational support system.

Exemplary System

Figure 1:
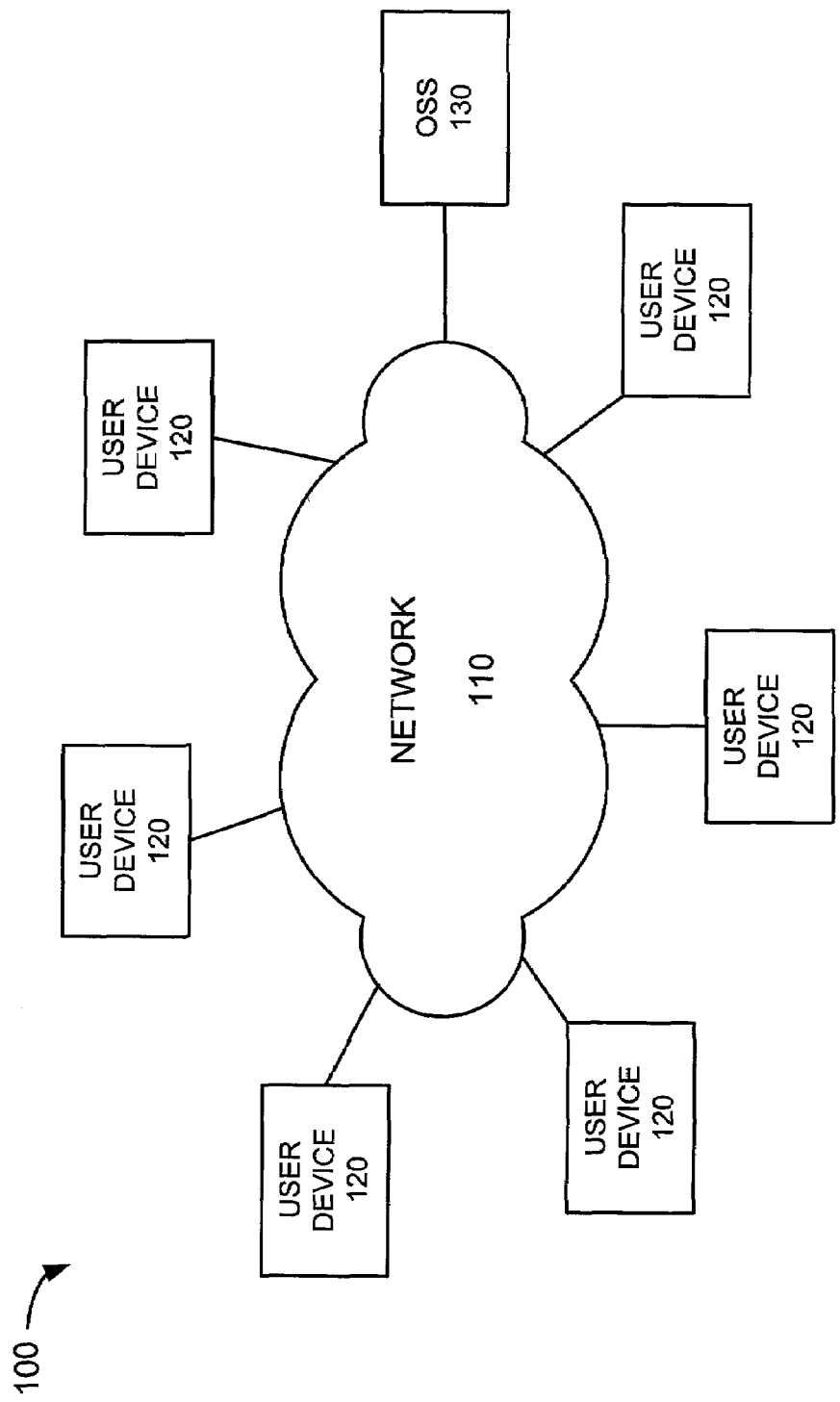
FIG. 1 illustrates an exemplary system in which systems and methods, consistent with the present invention, may be implemented.

FIG. 1 illustrates an exemplary system 100 in which systems and methods, consistent with the present invention, may be implemented. In FIG. 1, system 100 includes a network 110 that interconnects a group of user devices 120 and an operational support system (OSS) 130. It will be appreciated that a typical system may include more or fewer devices than illustrated in FIG. 1. Moreover, system 100 may include additional devices (not shown) that aid in the transfer, processing, and/or reception of data.

The network 110 may include, for example, the Internet, an intranet, a local area network (LAN), a metropolitan area network (MAN), a wide area network (WAN), a public switched telephone network (PSTN), and/or some other similar type of network. In fact, the network 110 may include any type of network or combination of networks that permits routing of information from a particular source to a particular destination.

The user devices 120 may include a type of computer system, such as a mainframe, minicomputer, or personal computer, a type of telephone system, such as a POTS telephone or a session initiation protocol (SIP) telephone, and/or some other similar type of device that is capable of transmitting and receiving information to/from the network 110. The user device 120 may connect to the network via any conventional technique, such as a wired, wireless, or optical connection.

Figure 2:
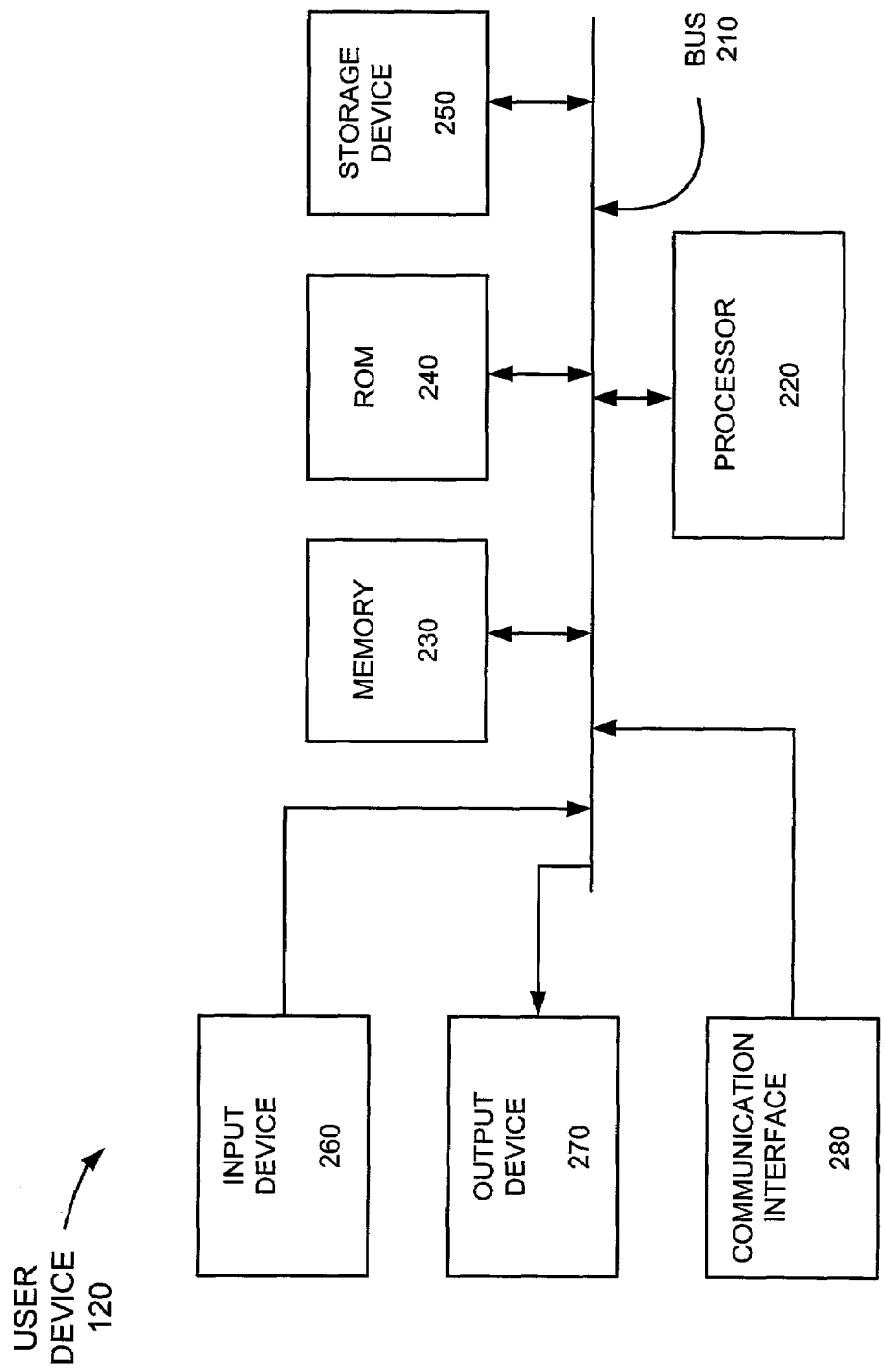
FIG. 2 illustrates an exemplary configuration of a user device of FIG. 1 in an implementation consistent with the present invention.

FIG. 2 illustrates an exemplary configuration of a user device 120 of FIG. 1 in an implementation consistent with the present invention. In FIG. 2, the user device 120 includes a bus 210, a processor 220, a memory 230, a read only memory (ROM) 240, a storage device 250, an input device 260, an output device 270, and a communication interface 280. The bus 210 may include one or more conventional buses that permit communication among the components of the user device 120.

The processor 220 may include any type of conventional processor or microprocessor that interprets and executes instructions. In one implementation consistent with the present invention, the processor 220 executes the instructions to cause a web browser to be displayed to an operator of the user device 120. As will be described in more detail below, the operator may receive reports from the OSS 130 via this web browser.

The memory 230 may include a random access memory (RAM) or another type of dynamic storage device that stores information and instructions for execution by the processor 220. The memory 230 may also be used to store temporary variables or other intermediate information during execution of instructions by processor 220.

The ROM 240 may include a conventional ROM device and/or another type of static storage device that stores static information and instructions for the processor 220. The storage device 250 may include a magnetic disk or optical disk and its corresponding drive and/or some other type of magnetic or optical recording medium and its corresponding drive for storing information and/or instructions.

The input device 260 may include any conventional mechanism or combination of mechanisms that permits the operator to input information to the user device 120, such as a keyboard, a mouse, a microphone, a pen, a biometric input device, such as voice recognition device, etc. The output device 270 may include any conventional mechanism or combination of mechanisms that outputs information to the operator, including a display, a printer, a speaker, etc.

The communication interface 280 may include any transceiver-like mechanism that enables the user device 120 to communicate with other devices and/or systems, such as OSS 130. For example, the communication interface 280 may include a modem or an Ethernet interface to a network.

Returning to FIG. 1, the OSS 130 provides the infrastructure for integrating data from traditional telephony services and applications with advanced data application platforms. Through OSS 130, customers, using, for example, user device 120, may manage, configure, and provision traditional telephony and advanced data services in real time, obtain real time billing information, and generate reports using a rules-centric middleware core. In one embodiment, a customer may perform these functions through a single point of entry using an Internet accessible web interface.

Figure 3:
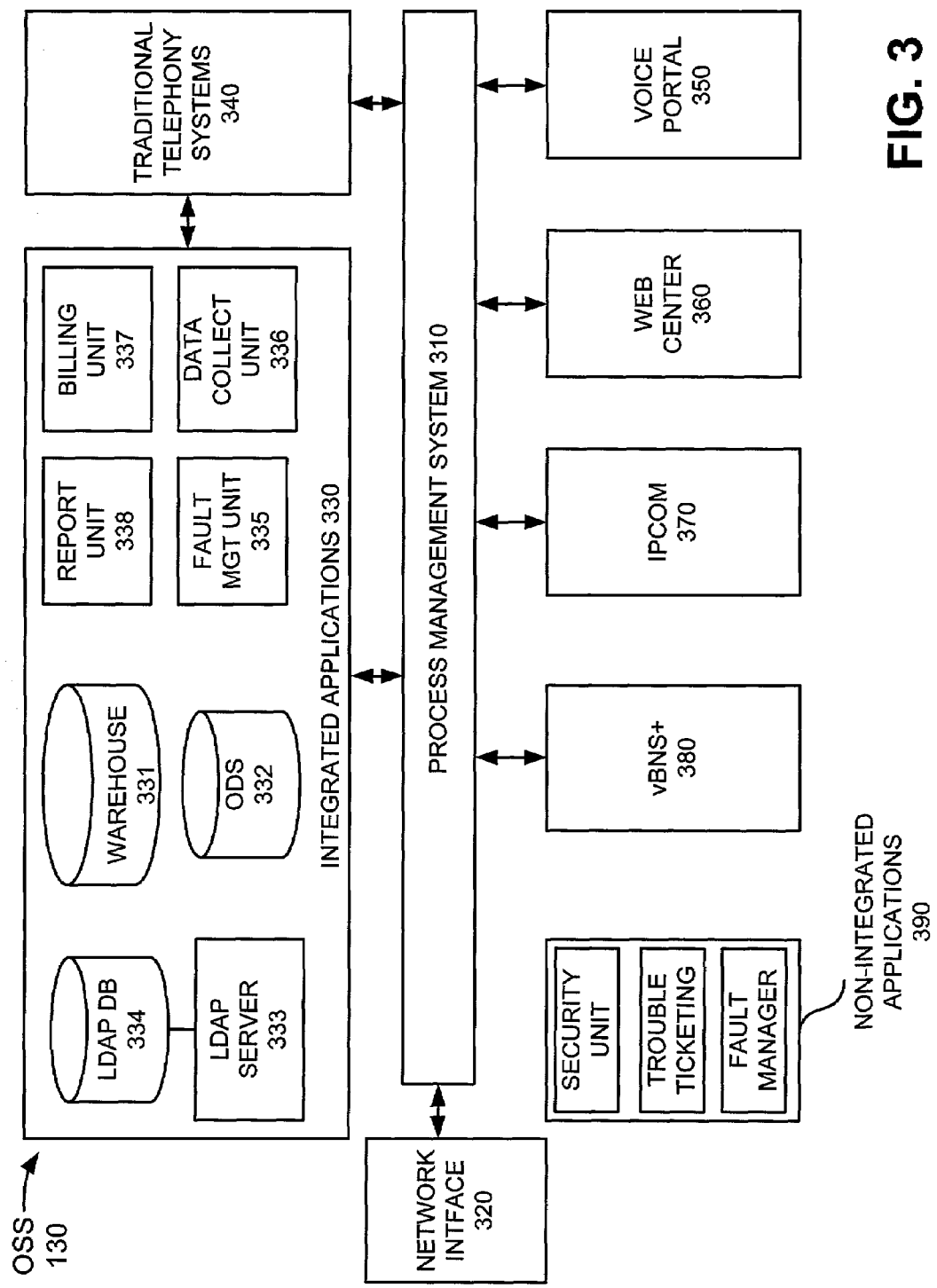
FIG. 3 illustrates an exemplary configuration of the operational support system of FIG. 1 in an implementation consistent with the present invention.

FIG. 3 illustrates an exemplary configuration of the OSS 130 of FIG. 1 in an implementation consistent with the present invention. As illustrated, the OSS 130 includes a process management system 310, a network interface 320, a group of integrated applications 330, a group of traditional telephony systems 340, a voice portal unit 350, a web center unit 360, an IPCOM unit 370, a very high performance backbone network service (vBNS+) unit 380, and a group of non-integrated applications 390. It will be appreciated that the OSS 130 may include other components (not shown) that aid in receiving, processing, and/or transmission of data.

The process management system 310 acts as the backbone to the OSS 130 by providing graphical process automation, data transformation, event management, and flexible connectors for interfacing with OSS components. In one implementation consistent with the present invention, the process management system 310 uses a Common Object Request Broker Architecture (CORBA) based publish-and-subscribe messaging middleware to integrate the different components of the OSS 130. Other techniques for integrating the different components of the OSS 130 may alternatively be used, such as eXtensible Markup Language (XML) or Enterprise JavaBeans (EJB). The process management system 310 may, for example, be implemented using Vitria Technology Inc.'s BusinessWare software system.

The network interface 320 provides a graphical user interface that allows users (e.g., customers, engineers, account teams, and the like) to access the components of the OSS 130. The network interface 320 may include commercial off the shelf (COTS) software or hardware packages, such as Siteminder® by Netegrity, Inc. and/or iPlanet™ by Sun Microsystems, Inc., custom software or hardware, or a combination of custom software/hardware and COTS software/hardware.

Via the network interface 320, customers may, for example, request that service be connected or disconnected, monitor or change network or user settings, obtain reports, and perform e-billing, account management, and trouble reporting and tracking functions in a real time manner. The network interface 320 may, for example, allow engineers to submit transactions to control and configure network elements and services in a real time manner. The network interface 320 may, for example, allow account teams to manage account creations and cancellations, generate sub-accounts from master accounts, access current account data, and access historical account data. As will be described in additional detail below, the network interface 320 allows a user to obtain reports relating to the products and services to which the user has subscribed over a network, such as network 110, via a user device 120.

The network interface 320 authenticates users and controls actions that authenticated users are allowed to execute in the OSS 130. In one implementation consistent with the present invention, the network interface 320 allows users access to the components of the OSS 130 via a single sign-on technique. This single sign-on eliminates the need for users to sign in (or authenticate themselves) in order to access different components of the OSS 130. Once authenticated, users may access those components of the OSS 130 to which they have been provided authorization.

The integrated applications 330 may include, for example, a data warehouse 331, an operational data store (ODS) 332, a lightweight directory access protocol (LDAP) based server 333, an LDAP database 334, a fault management unit 335, a data collection unit 336, a billing unit 337 and a report unit 338. The data warehouse 331 may include one or more separate databases for storing data. The data warehouse 331 acts as a repository for service order, account, usage and performance data. In one implementation, the data warehouse 331 may be implemented as a relational database management system (RDBMS) and may include a server (not shown) that controls access to the data warehouse 331.

The ODS 332 may also include one or more separate databases for storing data. The ODS 332 temporarily stores data that is used in the course of fulfilling, for example, account creation, service order management, and network provisioning operations. The ODS 332 also stores authentication and authorization data. This data defines users' roles and privileges. Like the data warehouse 331, the ODS 332 may be a RDBMS and may include a server (not shown) that controls access to the ODS 332.

The LDAP server 333 may be a general directory server that controls access to the LDAP database 334. The LDAP database 334 may be an LDAP-based repository that stores information associated with users in a hierarchical, tree-like structure. For example, the LDAP database 334 may store attributes for a user that may include preferences associated with the following exemplary services: call blocking, follow-me, call forwarding, voice mail, conference calling, single line extension, call screening, quality of service, class of service, dial plan restrictions, dynamic registration, secondary directory number and call transfer. The LDAP database 334 may store this information as one or more directory entries for each user. Each directory entry may include an identifier associated with the user and a collection of attributes associated with the user. Each of the attributes may include a type and one or more values that identify the user's settings associated with that type. In this manner, the LDAP server 333 and LDAB database 334 provide a system that enables the user's preferences regarding various services to be stored, searched, updated and retrieved in a quick and efficient manner.

The LDAP server 333 and LDAP database 334 are shown as separate devices. It should be understood, however, that these two devices may both be part of the same directory server in implementations consistent with the present invention.

The fault management unit 335 monitors and manages the operation of the OSS 130. The fault management unit 335 may receive information from every device, computer and application in the OSS 130 via the process management system 130. In situations where a fault has been detected, the fault management unit 335 may transmit a trouble ticket identifying the fault to the appropriate system administrator.

The data collection unit 336 collects customer usage and performance data for the devices supported by the OSS 130, transforms the data, if necessary, and passes the data on to the appropriate device, such as the billing unit 337. In one implementation, the data collection unit 336 utilizes a hierarchical architecture, having a centralized manager that defines and manages collection and data transformation schemas. Individual, lower level gatherers interface with source targets.

The billing unit 337 receives customer usage and performance data from the data collection unit 336 and generates bills in a well-known manner based thereon. The billing unit 337 may be configured with a variety of rating rules and plans and may provide mechanisms to manage and create rating plans, as well as mechanisms for building revenue reports and generating billing reports. The rating rules may be customized based on a particular customer's requirements or generalized. The rating rules may include traditional telephony styled rating rules that include time-of-day, day-of-week, distance-based, flat rate, non-recurring, and recurring on a definably regular basis, such as weekly, bi-weekly, monthly, etc., ratings. In an exemplary implementation of the present invention, the billing unit 337 may also provide bonus points, airline miles, and other incentive items as part of the rules-based rating and billing service.

Billing unit 337 may provide revenue and billing reports to authorized parties. Billing unit 337 may allow customers to access previous invoices and view current charges not yet billed. In an exemplary implementation consistent with the present invention, billing unit 337 may transfer rated events and summary records into other billing and revenue systems. For example, billing unit 337 may receive and transfer billing information or event information to a legacy billing system (i.e., an existing billing system) that generates the actual bill. In alternative implementations, billing unit 337 may provide hard copy bills and/or provide electronic bills to a customer. In this implementation, billing unit 337 may be configured to perform electronic payment handling.

As customer orders and accounts are created or modified through normal business functions, the OSS 130 keeps the billing unit 337 up to date in a real time manner via the process management system 310. Authorized parties may also extract real time data from the billing unit 337.

The report unit 338 may interact with various components of the OSS 130, such as the ODS 332 and billing unit 337, to provide users (e.g., customers, engineers, and accountants) with the ability to obtain reports based on real time data. The reports may include, for example, billing reports, reports regarding the usage and/or performance of the network, etc. As described in more detail below, the user may gain access to the report unit 338, as well as the other components of the OSS 130, via a single sign-on.

The traditional telephony systems 340 may include one or more components that are typically used in a telecommunications network. In one implementation, the traditional telephony systems 340 include one or more legacy systems, such as an order entry system, provisioning system, billing system, and the like.

The voice portal unit 350 provides a variety of information services to subscribers. These services may include, for example, banking, brokerage, and financial services, travel and entertainment services, distribution and shipping services, insurance services, health and pharmaceutical services, manufacturing services, and the like. The voice portal unit 350 may store subscriber profiles to determine a subscriber's device preference (e.g., a cellular telephone, a personal digital assistant, a paging device, and the like) and may also track a subscriber's access to the services for billing purposes.

The web center 360 acts as a virtual call center by queuing, routing, and distributing communications from any first location to an appropriate agent at any second location.

The web center 360 allows agents to handle multiple mediums (e.g., inbound telephone calls, faxes, e-mails, voicemail, VoIP transactions, etc.) via a single browser-based interface.

The IPCOM unit 370 may include one or more devices that provide VoIP services to subscribers. The subscribers may make and receive calls via an IP communications network using, for example, session initiation protocol (SIP) telephones. The IPCOM unit 370 may support the following exemplary services: follow me, call blocking, call forwarding, voice mail, conference calling, single line extension, call screening, quality of service, class of service, dial-plan restrictions, dynamic registration, secondary directory number, and call transfer. Customers may set or change attributes associated with these features via the network interface 320.

The vBNS+unit 380 provides the IP infrastructure for the IP communications network. The vBNS+unit 380 may include a group of routers that route packets in the network. The non-integrated applications 390 may include, for example, a security unit, a trouble ticketing unit, and a fault manager. The security unit may include one or more firewalls for securing the network interface 320, telephone equipment (e.g., PBX, switch, and redirect server), and network operations. The trouble ticketing unit manages the issuance and resolution of trouble tickets. The fault manager monitors the hardware components of the OSS 130.

Figure 4:
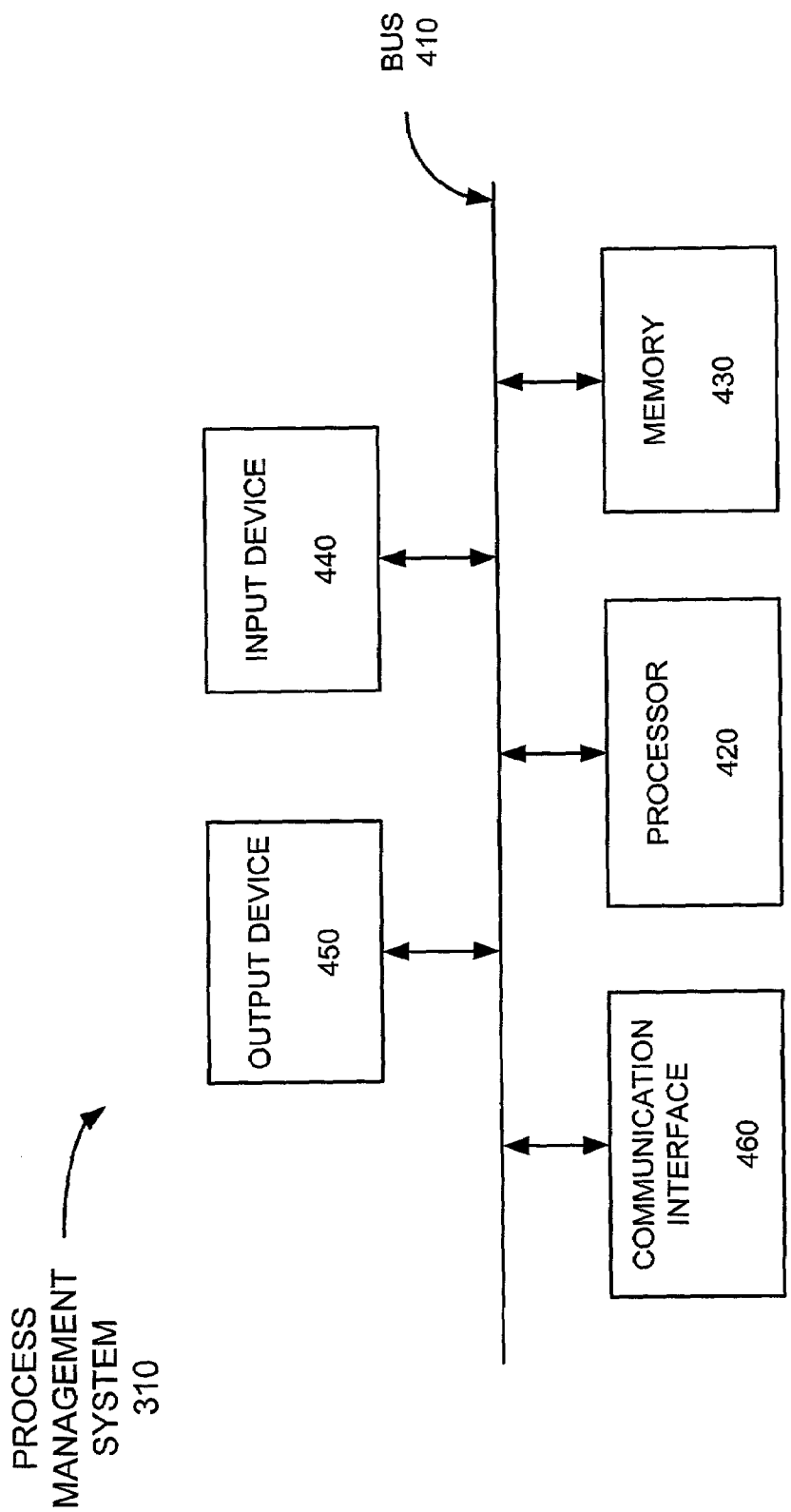
FIG. 4 illustrates an exemplary configuration of the process management system of FIG. 3 in an implementation consistent with the present invention.

FIG. 4 illustrates an exemplary configuration of the process management system 310 of FIG. 3 in an implementation consistent with the present invention. As illustrated, the process management system 310 includes a bus 410, a processor 420, a memory 430, an input device 440, an output device 450, and a communication interface 460. The bus 410 permits communication among the components of the process management system 310.

The processor 420 may include any type of conventional processor or microprocessor that interprets and executes instructions. The memory 430 may include a RAM or another type of dynamic storage device that stores information and instructions for execution by the processor 420; a ROM or another type of static storage device that stores static information and instructions for use by the processor 420; and/or some type of magnetic or optical recording medium and its corresponding drive.

The input device 440 may include any conventional mechanism or combination of mechanisms that permits an operator to input information to the process management system 310, such as a keyboard, a mouse, a pen, a biometric mechanism, and the like. The output device 450 may include any conventional mechanism or combination of mechanisms that outputs information to the operator, including a display, a printer, a speaker, etc. The communication interface 460 may include any transceiver-like mechanism that enables the process management system 310 to communicate with other devices and/or systems, such as the network interface 320, integrated applications 330, traditional telephony systems 340, etc. via a wired, wireless, or optical connection.

Execution of the sequences of instructions contained in a computer-readable medium, such as memory 430, causes processor 420 to implement the functional operations described below. In alternative embodiments, hardwired circuitry may be used in place of or in combination with software instructions to implement the present invention. Thus, the present invention is not limited to any specific combination of hardware circuitry and software.

Figure 5:
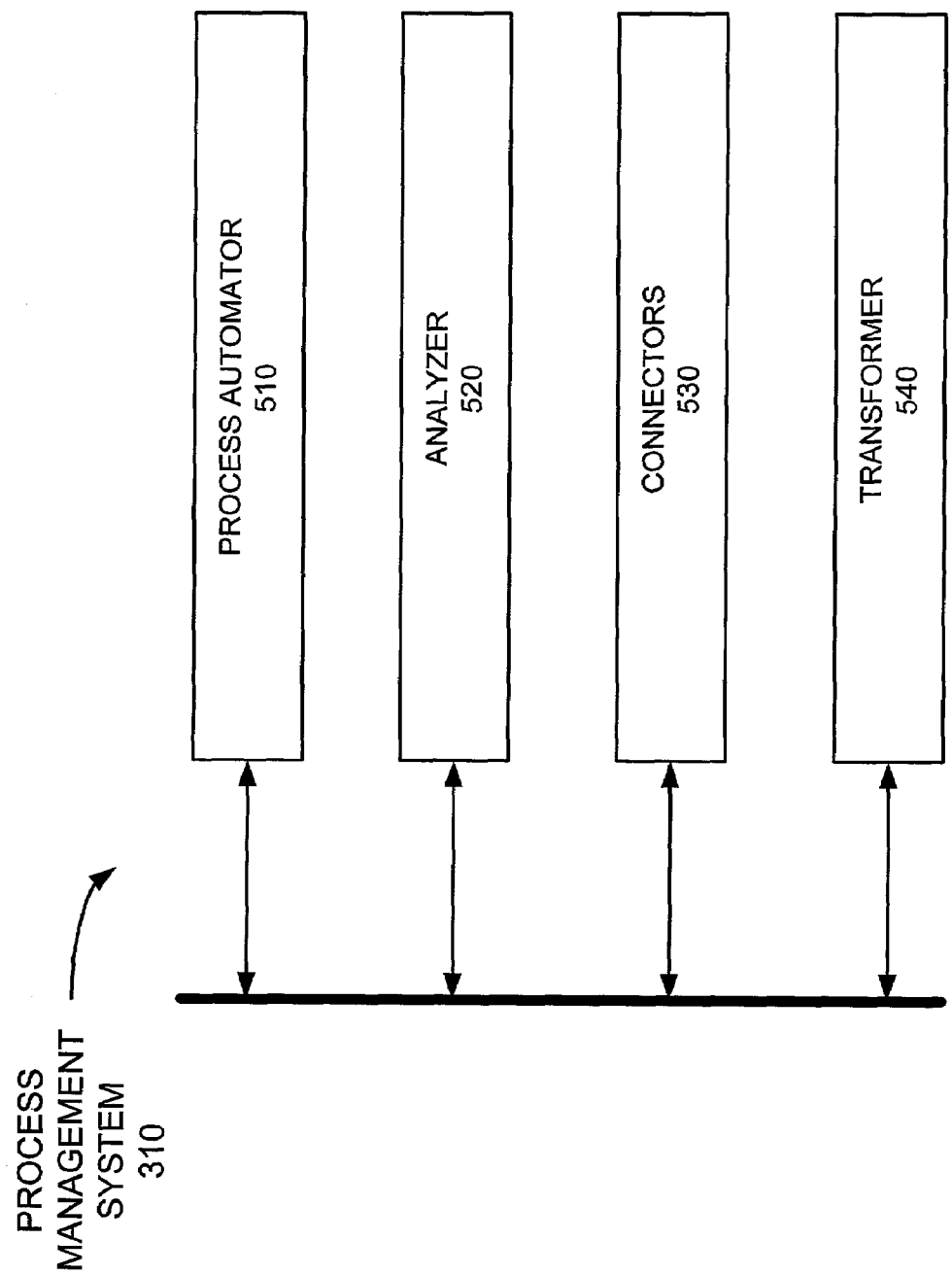
FIG. 5 illustrates an exemplary functional block diagram of the process management system of FIG. 3 in an implementation consistent with the present invention.

FIG. 5 illustrates an exemplary functional block diagram of the process management system 310 of FIG. 3 in an implementation consistent with the present invention. As illustrated, the process management system 310 includes a process automator 510, an analyzer 520, a group of connectors 530, and a transformer 540. It will be appreciated that the process management system 310 may include additional functional elements (not shown) that aid in the reception, processing, and/or transmission of data.

The processor automator 510 includes a modeling tool that allows event processing to be visually modeled by engineers and product development analysts. The process automator 510 can then execute these models to create an automated business process. The analyzer 520 provides on-going and real time monitoring of the components of the OSS 130. The analyzer 520 delivers reports, history, and trending on events processed through the process management system 310.

The connectors 530 include a group of customized rules that allows the components of the OSS 130 to interact and communicate with the process management system 310. A unique connector 530 may be established for each component in the OSS 130. As new components are added to the OSS 130, new connectors 530 are established to allow the new components to communicate with the existing components of the OSS 130. Once the connectors 530 have been established, the OSS components may communicate with the process management system 310 via standard messaging or through full publish/subscribe processing. The transformer 540 inspects data received by the connectors 530. The transformer 540 may also transform the data received by the connectors 530, if necessary, prior to the data being transferred on to its destination.

Figure 6:
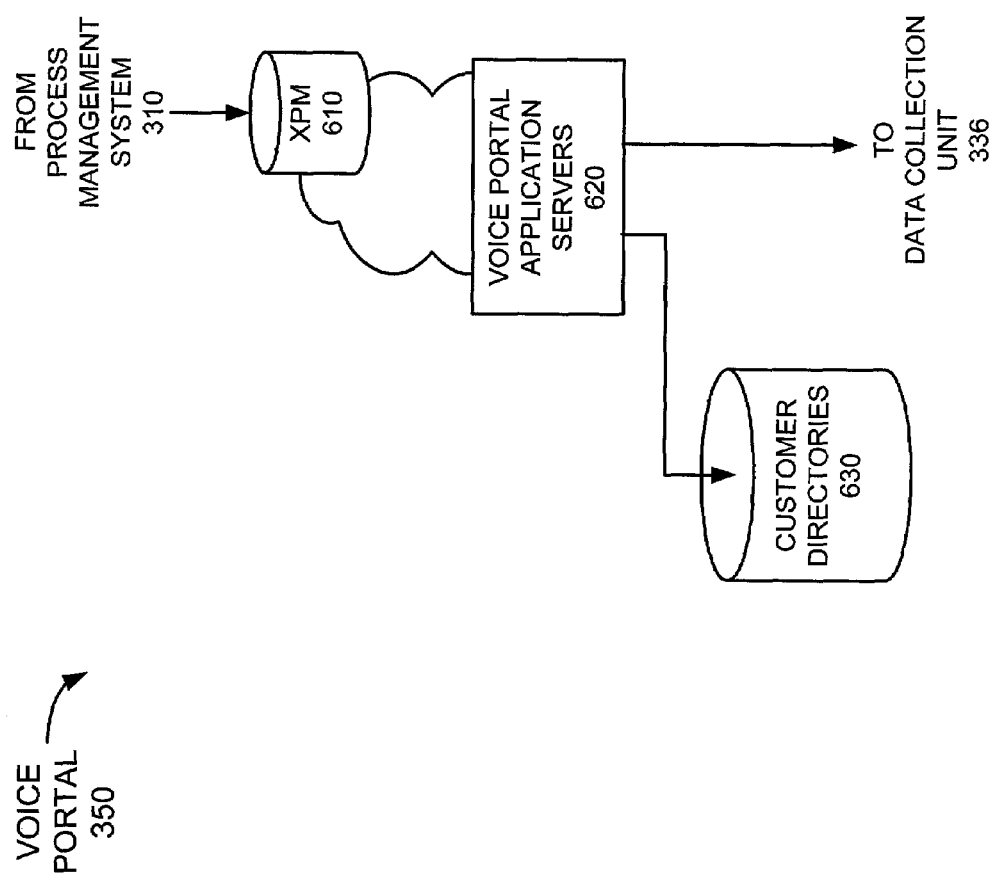
FIG. 6 illustrates an exemplary configuration of the voice portal unit of FIG. 3 in an implementation consistent with the present invention.

FIG. 6 illustrates an exemplary configuration of the voice portal unit 350 of FIG. 3 in an implementation consistent with the present invention. As illustrated, the voice portal unit 350 includes an eXtensible Program Management (XPM) unit 610, one or more voice portal application servers 620, and a customer directory database 630. The XPM unit 610 receives user profile information from the network interface 320 via the process management system 310 and stores this information for use by the voice portal application servers 620. The XPM unit 610 may also receive other information, such as information identifying the device(s) (e.g., personal digital assistant, cellular telephone, pager, etc.) by which the customer wishes to receive the service(s) provided.

The voice portal application servers 620 may include one or more servers that interact with the XPM unit 610 to provide, for example, banking, brokerage, and financial services, travel and entertainment services, distribution and shipping services, insurance services, health and pharmaceutical services, manufacturing services, and the like. Voice portal application servers 620 may also provide data collection unit 336 with information regarding what services are accessed and by whom. The data collection unit 336 may then pass this information on to the billing unit 337 for billing purposes. The voice portal application servers 620 may be located at the OSS 130 or distributed throughout the network 110. The customer directories 630 may store information relating to the services provided by the voice portal application servers 620. For example, the customer directories 630 may store stock quotes, current weather forecasts, real time sports scores, etc.

Figure 7:
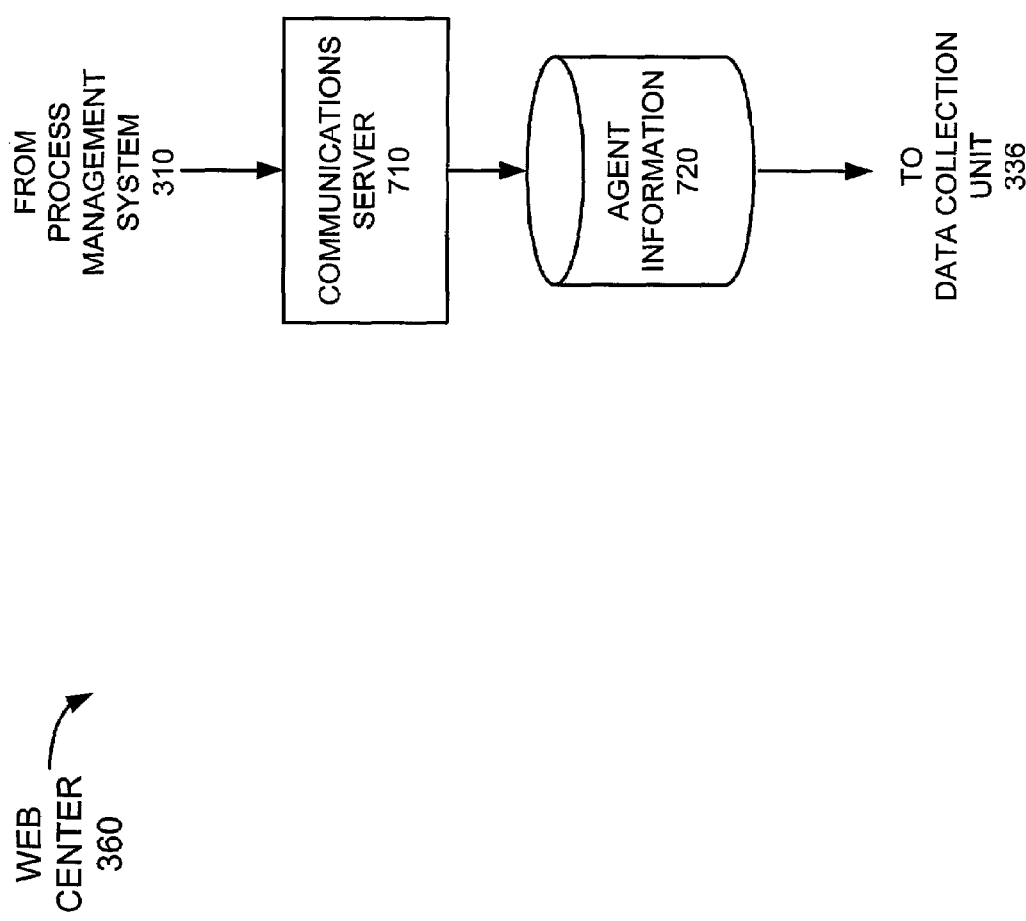
FIG. 7 illustrates an exemplary configuration of the web center of FIG. 3 in an implementation consistent with the present invention.

FIG. 7 illustrates an exemplary configuration of the web center 360 of FIG. 3 in an implementation consistent with the present invention. As illustrated, the web center 360 includes a communications server 710 and an agent information database 720. The communications server 710 queues, routes, and distributes communications from any first location to an appropriate agent at any second location. The communications server 710 may determine the appropriate agent based on data stored in the agent information database 720. The agent information database 720 may store agent activity information, the particular skills of the agents, and the like. Once a customer has utilized the services of the web center 360, the usage information may be transmitted to the data collection unit 336 and then to the billing unit 337 for billing. Users may, via the network interface 320, provision new services, such as order a toll free number, and/or create new accounts at the web center 360.

Figure 8:
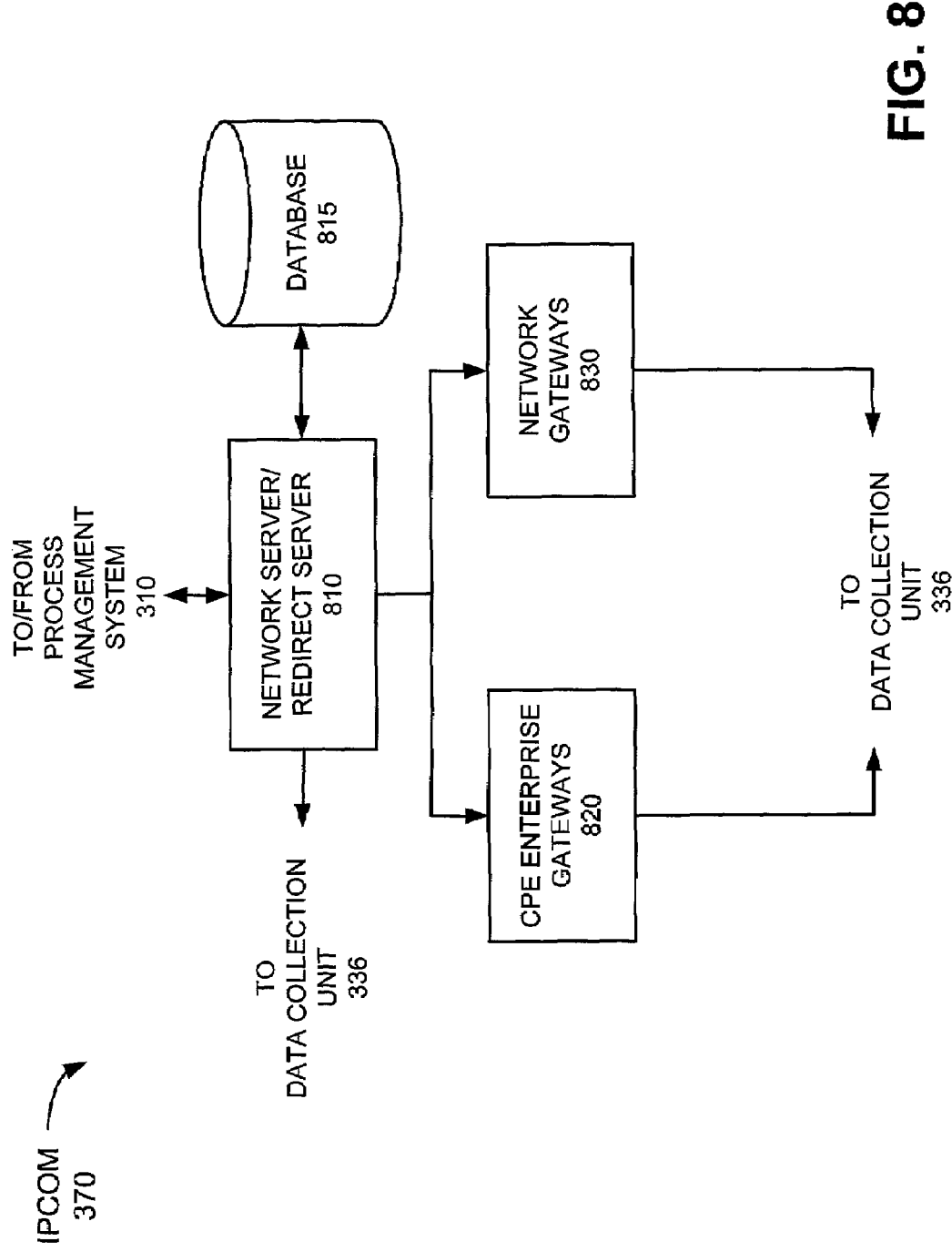
FIG. 8 illustrates an exemplary configuration of the Internet Protocol Communications (IPCOM) unit of FIG. 3 in an implementation consistent with the present invention.

FIG. 8 illustrates an exemplary configuration of the IPCOM unit 370 of FIG. 3 in an implementation consistent with the present invention. As illustrated, the IPCOM unit 370 includes a network server/redirect server 810, CPE enterprise gateways 820, and network gateways 830. The network server/redirect server 810 processes calls made over the IP communications network based on data stored in an associated database 815. The database 815 may store data (or records) relating to call processing (e.g., information identifying the device by which the subscriber wishes to receive the call, network configuration information, etc.), subscriber profiles (e.g., subscriber identifiers), and network-supported features. The network server/redirect server 810 may direct calls to the appropriate gateway 820 or 830 based on this data. The network-supported features may include, for example, follow me, call blocking, call forwarding, voice mail, conference calling, single line extension, call screening, quality of service, class of service, dial-plan restrictions, dynamic registration, secondary directory number, and call transfer.

The CPE enterprise gateways 820 may include one or more gateways for linking customer systems to the IP communications network. The CPE enterprise gateways 820 may, for example, connect to a customer's PBX and convert time division multiplexed (TDM) voice data into VoIP packets and voice signaling into SIP messages. The network gateways 830 include one or more gateways for linking the IP communications network to the PSTN in a well-known manner. The redirect server 810, CPE enterprise gateways 820, and network gateways 830 track customer access and transmit this customer access data to the data collection unit 336 for billing purposes.

Figure 9:
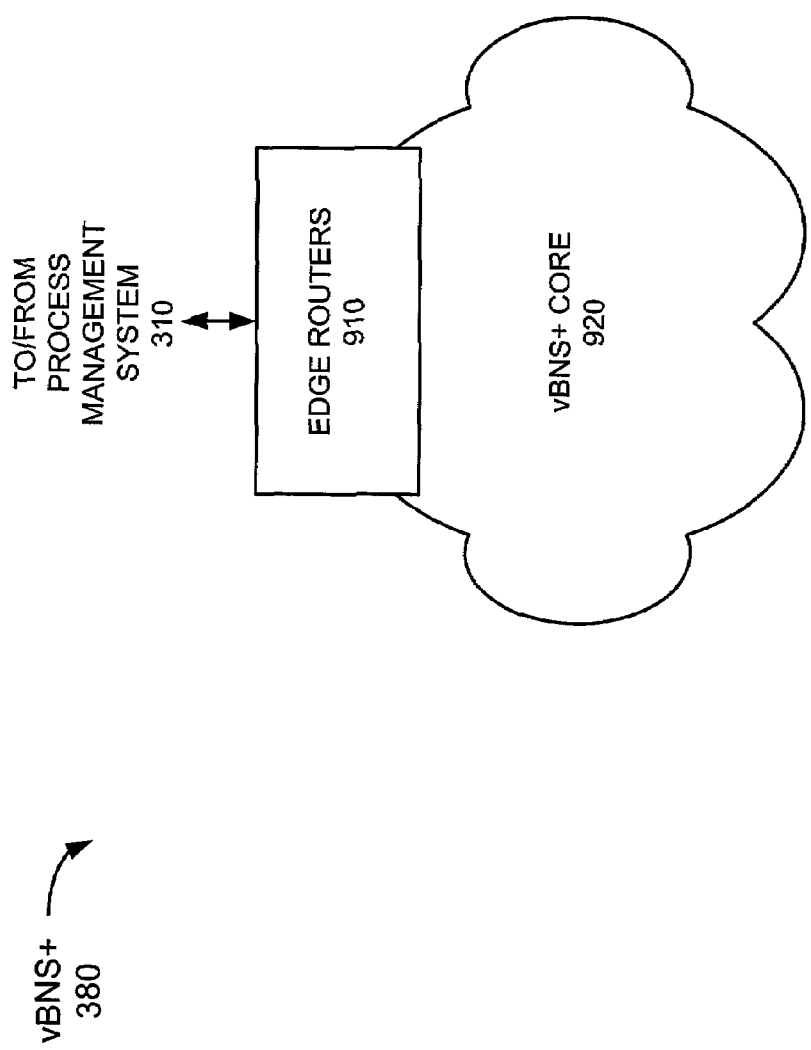
FIG. 9 illustrates an exemplary configuration of the very high performance backbone network service unit of FIG. 3 in an implementation consistent with the present invention.

FIG. 9 illustrates an exemplary configuration of the vBNS+ unit 380 of FIG. 3 in an implementation consistent with the present invention. As illustrated, the vBNS+ unit 380 includes a group of edge routers 910 that route packets to/from the vBNS+ core network 920. The edge routers 910 may connect to the network server/redirect server 810, network gateways 830, customer's CPE equipment, other routers in the IPCom network, directly to SIP telephones, etc. The edge routers 910 may be configured or updated via the network interface 320. The vBNS+core 920 may include one or more core routers for routing packets between edge routers 910.

The foregoing description of the OSS 130 provides an overview of the components and operation of the OSS 130. A more detailed description of the present invention is provided below.

EXEMPLARY PROCESSING

As described above, the OSS 130 offers a unique combination of products and services (e.g., billing, reporting, voice portal applications, VoIP services, etc.). In addition to the user having to login (or register) with the OSS 130 in order to gain access to the products and service provided thereby, some of these individual products or services may require the user to login a second time to gain access to the particular product or service desired. Implementations consistent with the present invention eliminate the need for users to login more than once to gain access to the products and services of the OSS 130. While the foregoing processing is described in relation to the report unit 338, it will be appreciated that the processing is equally applicable to other units of the OSS 130 or to other systems in general that require users to login multiple times.

Figure 10:
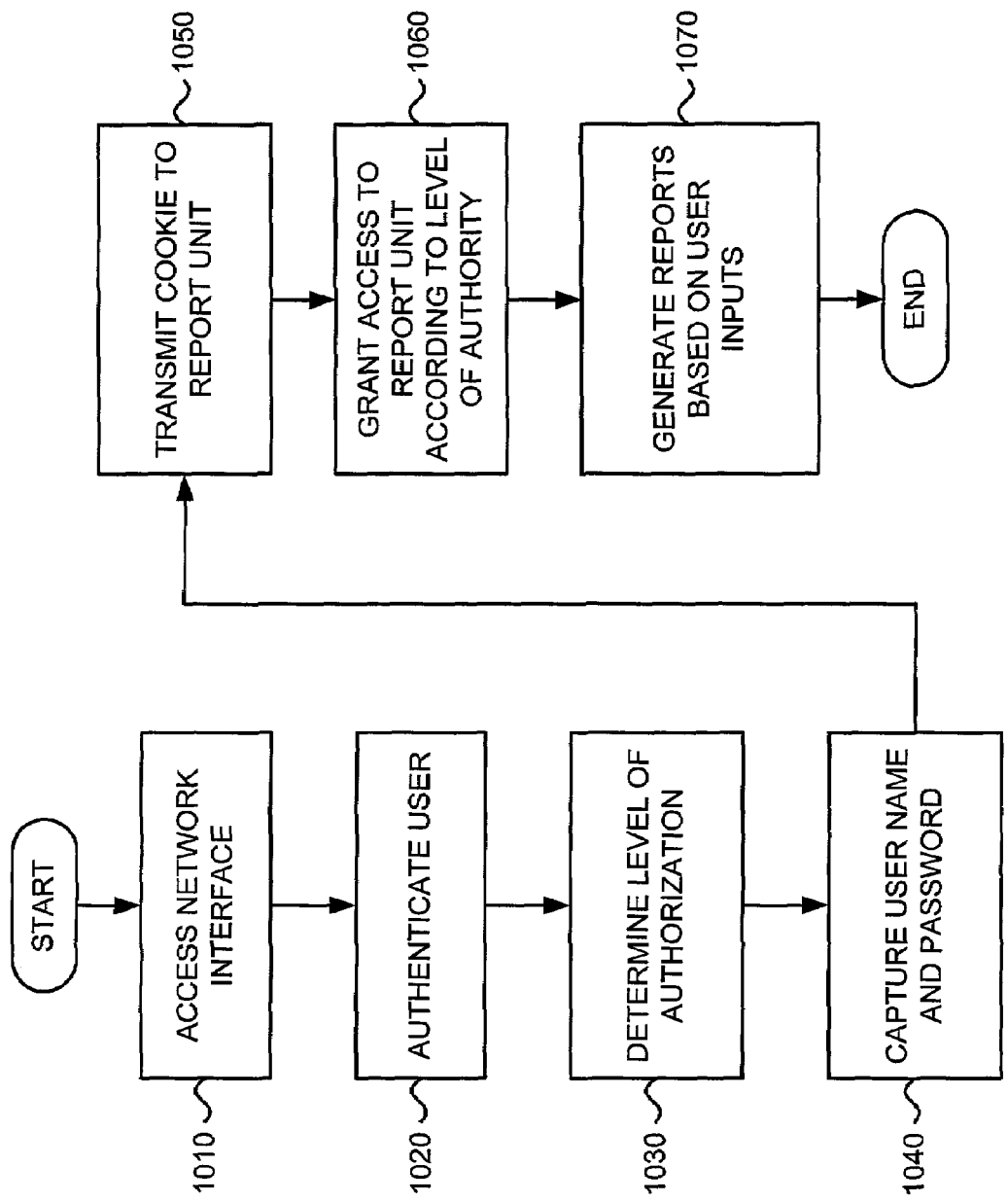
FIG. 10 illustrates an exemplary process for accessing the report unit in an implementation consistent with the present invention.

FIG. 10 illustrates an exemplary process for accessing the report unit 338 in an implementation consistent with the present invention. Processing may begin with a user (e.g., a customer, an accounting person, etc.) establishing a connection with the network interface 320 [act 1010]. The user may, for example, accomplish this via any conventional Internet connection by entering a link or address, such as a uniform resource locator (URL), associated with the network interface 320. In alternative implementations, the user may establish a direct connection with the network interface 320. In each of these scenarios, the network interface 320 may then transmit a login screen to the user in order to authenticate the user [act 1020 ].

Figure 11:
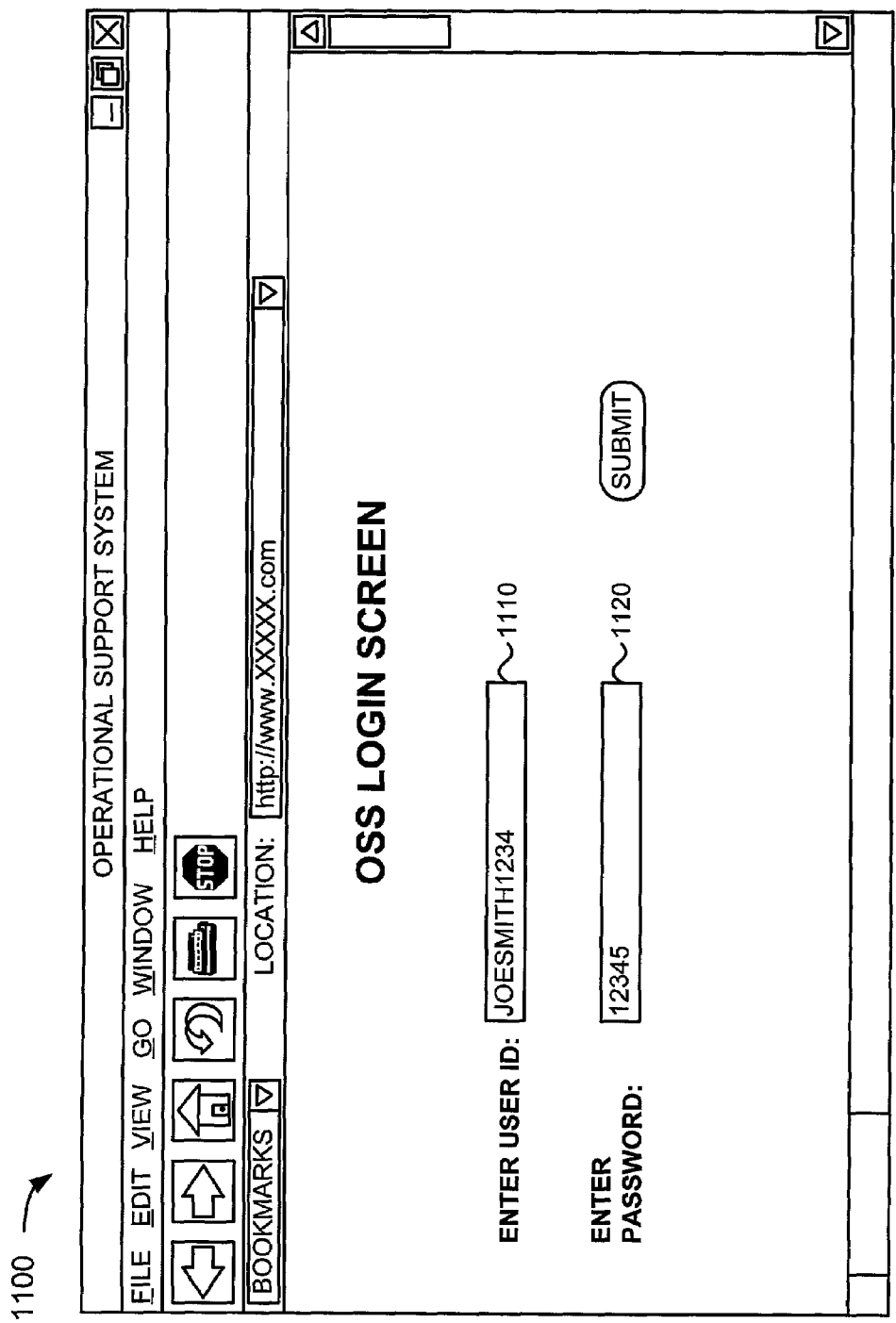
FIG. 11 illustrates an exemplary login screen consistent with the present invention.

FIG. 11 illustrates an exemplary login screen 1100 consistent with the present invention. As illustrated, the login screen 1100 prompts the user to enter an identifier (ID) 1110 and password 1120. The ID 1110 may be, for example, an e-mail address or some other unique identifier associated with the user. The password 1120 may be a unique alpha-numeric string created by the user.

The user may enter an ID 1110 and password 1120 in a well-known manner via the user device 120. In the exemplary login screen 1100 illustrated in FIG. 11, the user entered the ID "JOESMITH1234" and the password "12345." Upon selecting the submit button, the user device 120 may then transmit the user ID 1110 and password 1120 to the network interface 320. The network interface 320 may authenticate the user by, for example, comparing the user's ID 1110 and password 1120 to authorized identifiers and passwords [act 1020].

Once authenticated, the network interface 320 may determine the level of authorization with which the user is associated [act 1030]. A user's level of authorization dictates which components, services, or records of the OSS 130 to which the user is granted access. For example, a director of a company may have access to the records of all of the company's employees. A supervisor in the company, however, may have access to only those records associated with employees under his/her immediate control. An employee may have access to only his/her own records.

Once the user is authenticated and a level of authorization has been determined, the network interface 320 may capture the user's ID 1110 and password 1120 [act 1040] and transmit this information to the report unit 338 [act 1050]. In one implementation consistent with the present invention, the network interface 320 captures the user's ID 1110 and password 1120 in a cookie and transmits this cookie to the report unit 338. In the example given above, the cookie may contain the following information:

| UserID | JOESMITH1234 | Password | 12345. |
|---|---|---|---|

In an alternative implementation, the network interface 320 may transmit the cookie to the report unit 338 in response to the user indicating a desire to view reports. For example, in response to the network interface 320 authenticating the user and determining a level of authorization, the network interface 320 may transmit one or more graphical user interface screens to the user device 120 to allow the user to perform account management and/or billing functions.

Figure 12:
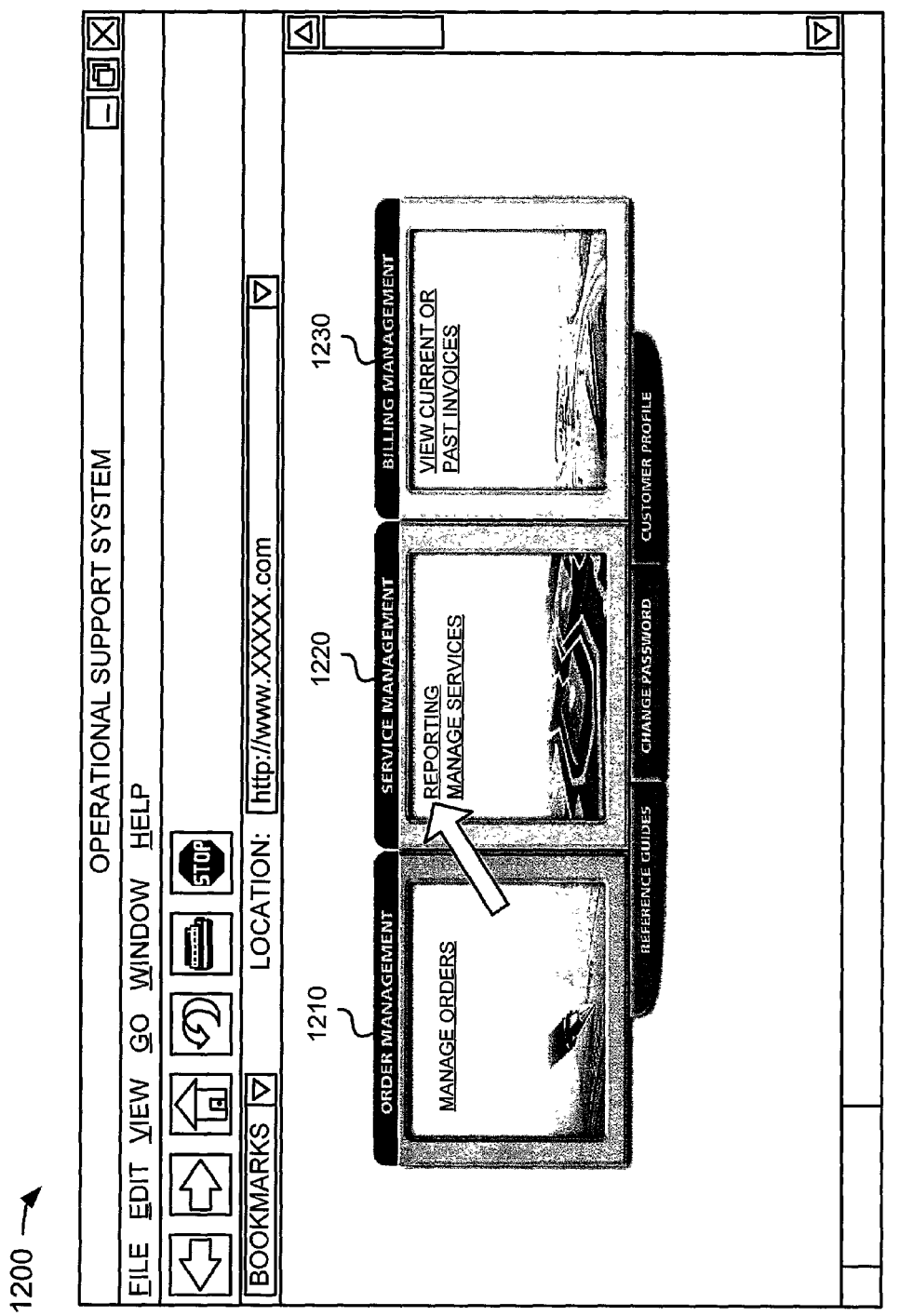
FIG. 12 illustrates an exemplary account management introductory screen that may be provided to the user by the network interface in an implementation consistent with the present invention.

FIG. 12 illustrates an exemplary account management introductory screen 1200 that may be provided to the user by the network interface 320 in an implementation consistent with the present invention. As illustrated, the account management introductory screen 1200 allows the user to select from the following exemplary categories: Order Management 1210, Service Management 1220, and Billing Management 1230. Via the Order Management category 1210, the user may create, modify, cancel, or view orders. Via the Service Management category 1220, the user may obtain reports and manage and provision IP communication services. Via the Billing Management category 1230, the user may view current or past invoices.

Upon selecting a link in one of the categories 1210–1230, such as the REPORTING link, the network interface 320 provides the user with one or more screens for performing the desired function(s). Assume that the user desires to obtain a near real-time report relating to port usage. To do so, the user may select the REPORTING link in the Service Management category 1220 illustrated in FIG. 12. In response, the network interface 320 may transmit the cookie, containing the user's ID 1110 and password 1120 to the report unit 338.

Upon receipt of the cookie, the report unit 338 may automatically perform a login operation in a manner that is transparent to the user [act 1060]. Here, the report unit 338 may authenticate the user by, for example, comparing the user's ID 1110 and password 1120 to authorized identifiers and passwords. The report unit 338 may then determine the level of authorization with which the user is associated (i.e., determine to which reports the user is permitted access). As indicated above, a director of a company may be permitted access to all of the company's records. In such a situation, the report unit 338 could allow the director to generate reports based on all of the company's records. In contrast, an employee may only have access to his/her own records. Therefore, the employee may only obtain reports based on his/her own records.

Figure 13:
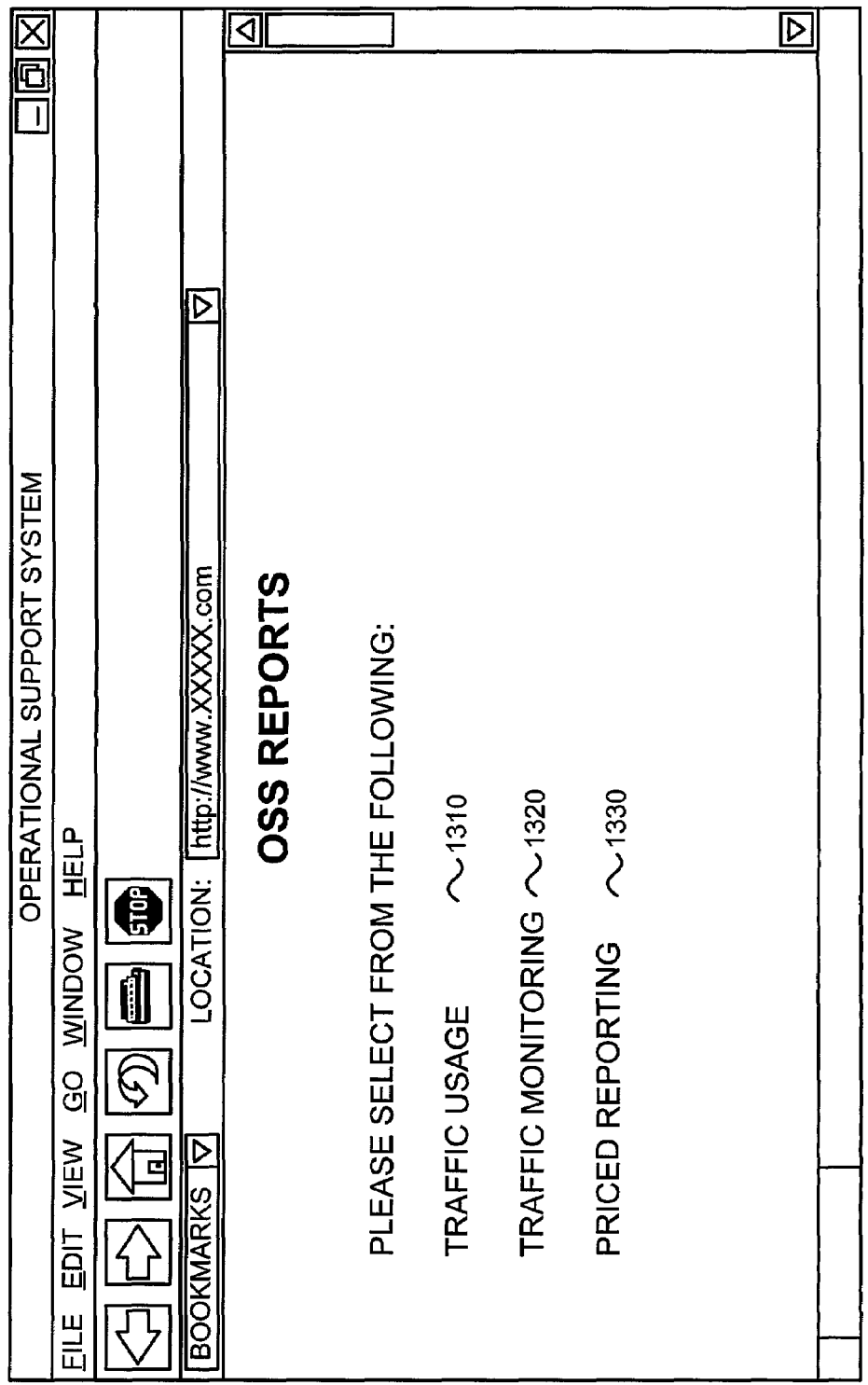
FIG. 13 illustrates an exemplary graphical user interface screen that may be provided to the user in an implementation consistent with the present invention.

Once the user is properly logged into the report unit 338 and the user's level of authorization has been determined, the network interface 320 may transmit one or more graphical user interface screens to the user to allow the user to request one or more reports from the report unit 338. FIG. 13 illustrates an exemplary graphical user interface screen 1300 that may be provided to the user in an implementation consistent with the present invention. As illustrated, the user may select to receive reports on traffic usage 1310, traffic monitoring 1320, and priced reporting 1330. It will be appreciated that the report unit 338 may provide other or different reports.

The traffic usage link 1310 allows users to analyze overall usage patterns by providing port usage reports. These reports may be based, for example, on hourly, daily, or weekly data. The traffic monitoring link 1320 provides users with reports on near real-time port usage, congestion, delay, packet loss statistics, etc. to allow users to make traffic routing decisions and to track performance against service level agreements. The priced reporting link 1330 provides users with reports on port usage by location or enterprise, user features, etc. based, for example, on hourly, daily, or weekly data. The user may use these reports to analyze usage statistics.

In response to the user selecting a particular report and inputting the desired parameters (e.g., a date range), the report unit 338 may then generate the requested reports in a well known manner and provide the reports to the user via the network interface 320 [act 1070].

The single sign on capability described above eliminates the need to replicate user and security information in a reporting system, making user administration a scalable process. Moreover, the authentication and authorization process ensures that users access only those reports for which they have permission thereby protecting sensitive reports.

CONCLUSION

Implementations consistent with the present invention provide a single sign on capability to a report unit of an operational support system. The single sign on technique of the present invention eliminates the need for a user to login once to access the products and services (e.g., VoIP services) offered by the operational support system, and a second time to access the reporting capability.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, it will be appreciated that the present invention can be implemented in hardware, software, or a combination of hardware and software. Thus, the present invention is not limited to any specific combination of hardware circuitry and software.

Moreover, while a series of acts has been described with respect to FIG. 10, the order of the acts may vary in other implementations consistent with the present invention. In addition, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for providing reports, comprising:
   receiving information from a user at a network interface;
   comparing the user information to a first set of previously stored user information;
   capturing the user information in a cookie when the user information corresponds to the first set of previously stored user information;
   transmitting the cookie to a reporting unit;
   comparing the user information from the cookie to a second set of previously stored user information; and
   providing one or more reports to the user when the user information from the cookie corresponds to the second set of previously stored user information.

2. The method of claim 1 wherein the user information includes a user identifier and password.

3. The method of claim 1 further comprising:
   determining, prior to the providing, a level of authorization based on the user information from the cookie.

4. The method of claim 3 wherein the providing includes:
   providing only those reports to which the user is determined to be authorized.

5. The method of claim 1 wherein the transmitting occurs in response to a command from the user.

6. The method of claim 5 wherein the command includes a request for a report.

7. The method of claim 1 wherein the transmitting occurs automatically when the user information corresponds to the first set of previously stored user information.

8. A method for accessing a device in an operational support system, comprising:
- receiving an identifier and password from a user at a network interface;
- authenticating the user using the identifier and password;
- transmitting the identifier and password to the device; and
- automatically authenticating the user based on the transmitted identifier and password at the device.

9. The method of claim 8 wherein the device is a report unit.

10. The method of claim 8 further comprising:
- capturing, after the authenticating, the identifier and password in a cookie.

11. The method of claim 10 wherein the transmitting includes:
- transmitting the cookie to the device.

12. The method of claim 8 further comprising:
- determining a level of authorization at the device based on the transmitted identifier and password.

13. The method of claim 12 wherein further comprising:
- granting access to the user to one or more reports based on the determined level of authorization.

14. The method of claim 13 further comprising:
- providing the one or more reports to the user via the network interface.

15. The method of claim 14 wherein the one or more reports include reports relating to network performance.

16. The method of claim 8 wherein the automatically authenticating includes:
- comparing the transmitted identifier and password to a group of previously stored identifiers and passwords.

17. The method of claim 8 wherein the transmitting occurs in response to a request for access to the device from the user.

18. An operational support system comprising:
- a network interface configured to:
  - receive an identifier and password from a user,
  - determine whether to grant access to the operational support system based on the identifier and password, and
  - transmit the identifier and password when access is granted; and
- a report unit configured to:
  - receive the identifier and password from the network interface,
  - automatically compare the identifier and password to stored identifiers and passwords, and
  - grant the user access to the report unit when the identifier and password correspond to one of the stored identifiers and passwords.

19. The operational support system of claim 18 wherein the network interface is further configured to:
- capture the received identifier and password in a cookie.

20. The operational support system of claim 19 wherein, when transmitting, the network interface is configured to:
- transmit the cookie to the report unit.

21. The operational support system of claim 18 wherein the report unit is further configured to:
- determine a level of authorization based on the identifier and password.

22. The operational support system of claim 21 wherein the report unit is further configured to:
- grant the user access to one or more reports based on the determined level of authorization.

23. The operational support system of claim 22 wherein the report unit is further configured to:
- provide the one or more reports to the user via the network interface.

24. The operational support system of claim 18 wherein the one or more reports relate to port usage.

25. A system for providing reports, comprising:
- means for receiving information from a user;
- means for comparing the user information to a first set of stored user information;
- means for capturing the user information in a cookie when the user information corresponds to the first set of stored user information;
- means for transmitting the cookie to a reporting unit;
- means for comparing the user information from the cookie to a second set of stored user information; and
- means for providing one or more reports to the user when the user information from the cookie corresponds to the second set of stored user information.

26. The system of claim 25 wherein the user information includes a user identifier and password.

27. The system of claim 25 further comprising:
- means for determining, prior to the providing, a level of authorization based on the user information from the cookie.

28. The system of claim 27 wherein the means for providing includes:
- means for providing only those reports to which the user is determined to be authorized.

29. The system of claim 25 wherein the means for transmitting transmits the cookie to the reporting unit automatically when the user information corresponds to the first set of stored user information.

30. The system of claim 25 wherein the means for transmitting transmits the cookie to the reporting unit in response to a command from the user.

* * * * *